US008385647B2

(12) United States Patent
Hawley et al.

(10) Patent No.: US 8,385,647 B2
(45) Date of Patent: Feb. 26, 2013

(54) METHOD OF IMAGE ANALYSIS USING SPARSE HOUGH TRANSFORM

(75) Inventors: Stephen Hawley, Florence, MA (US); Richard T. Minerich, Chicopee, MA (US)

(73) Assignee: Kofax, Inc., Irvine, CA (US)

( * ) Notice: Subject to any disclaimer, the term of this patent is extended or adjusted under 35 U.S.C. 154(b) by 952 days.

(21) Appl. No.: 12/436,854

(22) Filed: May 7, 2009

(65) Prior Publication Data

US 2009/0238459 A1    Sep. 24, 2009

Related U.S. Application Data

(63) Continuation-in-part of application No. 11/339,724, filed on Jan. 25, 2006, now Pat. No. 7,738,730.

(51) Int. Cl.
*G06K 9/00* (2006.01)
(52) U.S. Cl. ........ 382/173; 382/190; 382/282; 358/538; 358/453
(58) Field of Classification Search .................. 382/190, 382/278, 282; 358/537, 538, 453
See application file for complete search history.

(56) References Cited

U.S. PATENT DOCUMENTS

| | | | |
|---|---|---|---|
| 3,069,654 A | 12/1962 | Hough | |
| 5,063,604 A | 11/1991 | Weiman | |
| 5,220,621 A | 6/1993 | Saitoh | |
| 5,430,810 A | 7/1995 | Saeki | |
| 5,629,989 A | 5/1997 | Osada | |
| 5,825,915 A | 10/1998 | Michimoto et al. | |
| 5,832,138 A | 11/1998 | Nakanishi et al. | |
| 5,848,184 A * | 12/1998 | Taylor et al. | 382/173 |
| 5,953,388 A * | 9/1999 | Walnut et al. | 378/4 |
| 6,104,830 A | 8/2000 | Schistad | |
| 6,356,647 B1 | 3/2002 | Bober et al. | |
| 6,408,105 B1 | 6/2002 | Maruo | |
| 6,643,413 B1 | 11/2003 | Shum et al. | |
| 6,724,916 B1 | 4/2004 | Shyu | |
| 6,732,046 B1 | 5/2004 | Joshi | |
| 6,826,311 B2 | 11/2004 | Wilt | |
| 6,873,721 B1 | 3/2005 | Beyerer et al. | |
| 6,987,534 B1 | 1/2006 | Seta | |
| 7,023,447 B2 | 4/2006 | Luo et al. | |
| 7,339,585 B2 * | 3/2008 | Verstraelen et al. | 345/424 |
| 7,403,008 B2 * | 7/2008 | Blank et al. | 324/316 |
| 7,409,092 B2 * | 8/2008 | Srinivasa | 382/199 |
| 7,580,557 B2 * | 8/2009 | Zavadsky et al. | 382/141 |
| 7,643,665 B2 * | 1/2010 | Zavadsky et al. | 382/141 |

OTHER PUBLICATIONS

Richard O. Duda and Peter E. Hart, "Use of the Hough Transformation to Detect Lines and Curves in Pictures", Graphics and Image Processing, 1996.
Sandy Pavel, Selim G. Akl, "Efficient Algorithms for the Hough Transform on Arrays with Reconfigurable Optical Buses", Dept. of Computing and Information Science, 1996.

* cited by examiner

*Primary Examiner* — Yosef Kassa
(74) *Attorney, Agent, or Firm* — Zilka-Kotab, PC

(57) ABSTRACT

A digital image includes a plurality of pixels arranged in an array. In a method of analyzing the image, some of the pixels are purposefully not processed. In particular, only those pixels in a particular subgroup are processed according to a Hough or similar transform. The number of pixels in the subgroup is less than the total number of pixels in the image (e.g., as little as about 5% of the total pixels), and each pixel in the subgroup is pseudo-randomly selected. The Hough transform is inherently configured to function within the context of noisy images, for identifying features of interest in the image, as simulated by the pseudo-random selection and processing of less than the total number of pixels in the image. This significantly reduces the processor resources required to analyze the image.

29 Claims, 10 Drawing Sheets

Cell L = pixel (1, 3) [D]
Cell E = pixel (2, 0) [A]
pixel (2, 5) [C]
Cell I = pixel (4, 2)
Cell J = pixel (5, 3) [H]
Cell K = pixel (6, 4)

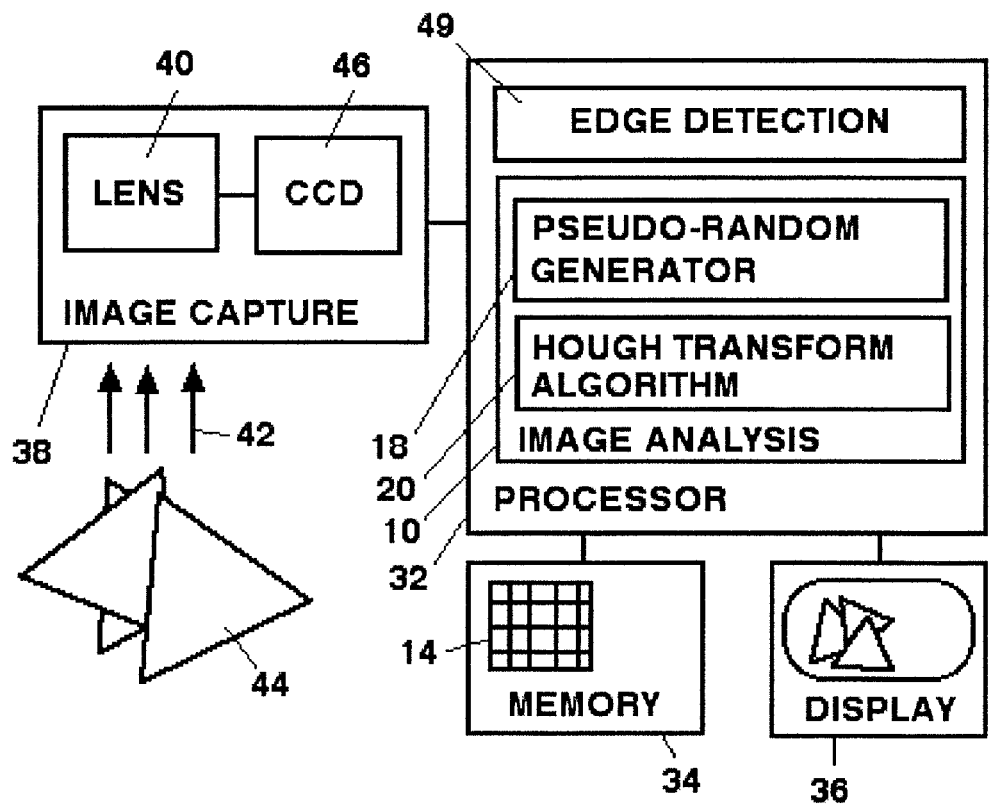
FIG. 6
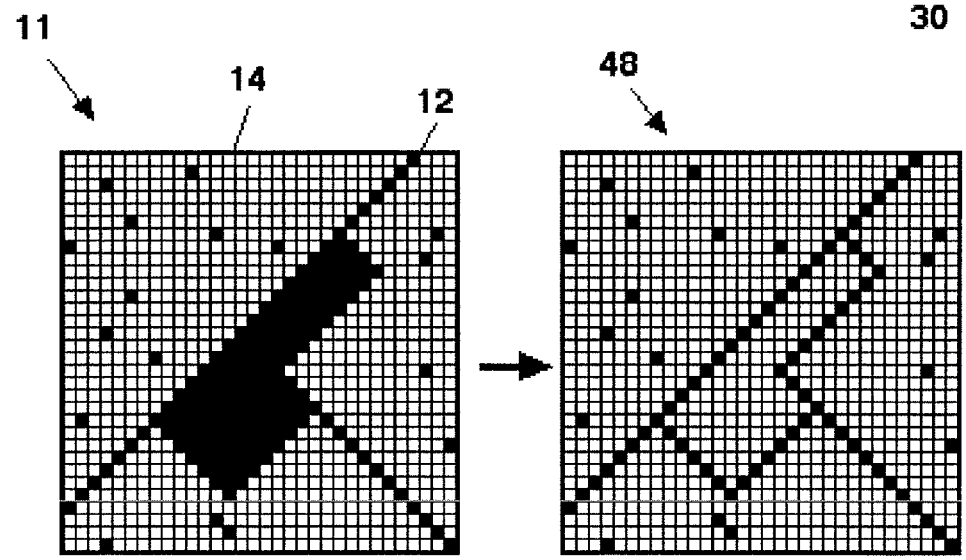
FIG. 7A  FIG. 7B

METHOD OF IMAGE ANALYSIS USING SPARSE HOUGH TRANSFORM

CROSS REFERENCE TO RELATED APPLICATIONS

This application is a Continuation-in-Part of, and claims priority to, U.S. patent application Ser. No. 11/339,724 entitled "METHOD OF IMAGE ANALYSIS USING SPARSE HOUGH TRANSFORM", filed on Jan. 25, 2006, which is herein incorporated by reference in its entirety.

TECHNICAL FIELD

The present invention relates to image analysis and, more particularly, to image analysis, transformation, and/or processing using a Hough or similar transform.

BACKGROUND OF THE INVENTION

Digital image processing involves implementing mathematical algorithms on a computer or other electronic processor to manipulate or otherwise process a picture stored in digital form. As stored in memory, a digital image is a grouping of numerical data representing an image in encoded form. For example, an image can be represented as an array of pixels (picture elements), each of which constitutes a small portion of the overall image. In the simplest of digital encoding schemes, a picture is cast in terms of black and white pixels only, with the black pixels represented as a binary "1" and the white pixels represented as a binary "0." The pixels in grey scale and color images can each be encoded as a string of bits, e.g., 8 bits/pixel in a grey scale picture and 256 bits/pixel in a color picture. Image processing may be used for purposes such as image modification, pattern recognition, and feature extraction. Feature extraction involves detecting or isolating various desired portions of a digitized image or video stream. For example, feature extraction may be used to automatically identify buildings and roadways in an aerial image, or to identify and process characters in an image containing text.

The Radon transform is a mathematical algorithm that is occasionally used in image processing and analysis for detecting linear structures and other features in a digital image. The Radon transform integrates a function over lines in a plane, mapping a function of position to a function of slope and y-intercept, per the following equation:

$$R\{f(x, y)\} = \int_{-\infty}^{\infty}\int_{-\infty}^{\infty} f(x, y)\delta(y - (mx + b))\,dx\,dy.$$

where "m" is the line slope and "b" is the y-axis intercept. The Radon transform can also be expressed with respect to "line normal" parameters, where instead of being characterized in terms of a slope and y-axis intercept, a line is characterized in terms of a value "r" or "ρ", the perpendicular distance from the line to the coordinate origin, and an angle "α" or "θ" between the perpendicular and the x-axis (see FIG. 2A):

$$R'(r, \alpha)[f(x, y)] = \int_{-\infty}^{\infty}\int_{-\infty}^{\infty} f(x, y)\delta(r - x\cos\alpha - y\sin\alpha)\,dx\,dy,$$

An application of the Radon transform for image processing is shown, for example, in U.S. Pat. No. 6,873,721 to Beyerer et al. However, it is more typically the case that a Hough transform is used for such applications. The Hough transform is a discreet form of the Radon transform, and is thereby well suited to processing digital images in addition to being less computationally intensive.

As noted, digital images contain a number of data points/pixels. Some of these data points will be indicative of features in the original picture, and some may result from noise. For example, FIG. 1A shows an aerial view (e.g., from a surveillance aircraft) of a road, a nearby structure, and brush/trees. FIG. 1B shows a possible digital image of the aerial view, and FIG. 1C shows a pixilated version of FIG. 1B. As can be seen, the image contains noise from signal interference, equipment limitations, environmental conditions, or the like, which partially obscures the features of interest. Accordingly, the features of interest are difficult to identify, especially within the context of automatic computer processing. The purpose of the Hough transform is to statistically determine the line equations that best fit the data in the image, as indicated in FIG. 1D.

The Hough transform involves converting data from Cartesian space (e.g., the x-y coordinate plane) to "Hough space." In the former, line data (for example) is expressed in terms of x and y coordinates, line slope, and a y-axis intercept. In the latter, line data is represented in terms of a normal parameterization. To elaborate, FIG. 2A shows a line in Cartesian space. The line can be represented by the standard line equation y=mx+b, where "m" is the slope of the line and "b" is the y-axis intercept. The line can also be represented in terms of normal parameters "θ" and "ρ". The value ρ represents the length between the coordinate origin and the nearest point on the line, which according to elementary geometry is the length of the line segment that is both normal to the line and that intersects the origin. θ is the angle between the x axis and normal, as indicated. The line equation for this geometry is given by:

$$x \cos \theta + y \sin \theta = \rho$$

$$\theta \to [0, \pi]$$

As should be appreciated, each pair of normal parameters (ρ, θ) uniquely defines a line. Similarly, every line in Cartesian space (FIG. 2A) corresponds to a single, unique point (ρ, θ) on the ρ and θ coordinate axes in Hough space (FIG. 2B).

While a line in the x-y plane corresponds to a point in the ρ-θ Hough space plane, the infinite number of lines that can be drawn through a point in x-y space map to a sinusoidal curve in the ρ-θ plane. (In other words, each line is a ρ-θ point in Hough space, and all the possible lines through a single point in the x-y plane form a sinusoidal curve in Hough space.) This relationship is illustrated for a point (3, 3) in FIGS. 3A and 3B. The Hough transform takes advantage of this relationship, and the fact that the sinusoidal curves in Hough space corresponding to points along a line in x-y space have a common intersection point. In other words, for two or more co-linear points in the x-y plane, each will map to a separate sinusoidal curve in the ρ-θ plane, with the curves intersecting at one and only one point (θ→0 to π; 2π=360°). An example in shown in FIGS. 4A and 4B. FIG. 4A shows four co-linear points A1-A4. Each point maps to a sinusoidal curve A1'-A4', respectively, in the normal parameterization plane (Hough space) as shown in FIG. 4B. (Again, each curve in Hough space corresponds to the all the possible lines drawn through a point on the x-y plane per the equation ρ=x cos θ+y sin θ.) The four curves A1'-A4' intersect at one point P1 corresponding to the normal parameters (ρ', θ'). These normal parameters in turn define the line in the x-y plane along which points A1-A4 fall. More generally, a set of points which form a straight line will produce Hough transforms which cross at the parameters for that line.

The Hough transform is used in digital image processing by translating data points (e.g., image pixels) from x-y space to curves in Hough space, and then, in effect, identifying points of intersections between the curves. The points where curves intersect in turn provide the line equations, in terms of (ρ, θ) pairs, for the line(s) that best fit the data. The curves in Hough space can also be analyzed to determine points where a maximum number of curves intersect at one point. Noise data falling outside the maximum values is eliminated, rendering the Hough transform useful for noisy images/signals. FIGS. 5A-5C show a simplified example. In FIG. 5A, an image is stored as an array of pixels (here, a 7×7 array), with white pixels having a 0 value and black pixels, representing data points (possible features of interest in the image), having a 1 value. The pixels are logically arranged with respect to the x-y coordinate axes, as indicated. FIG. 5B shows an accumulator table, which could be implemented as a memory array. (Cells in the accumulator array with a zero value are not shown, for clarity purposes.) Values for ρ are logically arranged along one axis, with divisions according to a selected resolution/granularity level and depending on the size of the pixel array. For example, for a 7×7 pixel array it might be expected to have values for ρ of between 7 and −7. Possible gradations might be 0.1, 0.2, or 0.5. The values for θ are along the other axis. Again, different levels of gradation are possible, e.g., values from 0 to π in π/8 increments.

In carrying out the Hough transform, each pixel point in x-y space is translated to discreet points on a curve in Hough space, according to the equation ρ=x cos θ+y sin θ. Thus, for pixel A (x=2, y=0) in FIG. 5A, the equation would be ρ=2 cos θ+0 sin θ=2 cos θ. Then, a series of values for ρ are calculated for the point, one for each gradation along the θ axis. (Thus, for pixel A, there would be a series of values, for example, of: ρ=2 cos 0; 2 cos π/8; 2 cos π/4; 2 cos 3π/8; 2 cos π/2; 2 cos 5π/8; 2 cos 3π/4; 2 cos 7π/8; and 2 cos π.) For each value, the appropriate cell in the accumulator table is incremented by 1. Subsequently, this is done for every black pixel in the x-y plane. The values for the data in FIG. 5A are plotted in FIG. 5B, which also graphically illustrates how the accumulator data corresponds to the sin wave plots, e.g., as in FIG. 4B. Many of the accumulator cells will have a zero or 1 value. Accumulator cells with a 2 value indicate a spot where two curves in Hough space intersect, corresponding to two co-linear points in the x-y plane. An accumulator cell with a maximum value corresponds to a line that best fits the data, while excluding noise. For example, cell B in FIG. 5B has an accumulator value of 4, corresponding to 4 co-linear points in x-y space. Cell B also provides the equation of the line through the 4 points, e.g., ρ=−1.4, θ=3π/4=135°, illustrated in FIG. 5C. Note that the equation of the line is given even though (i) certain data points along the line are missing, and (ii) the image contains noise pixels such as pixels C and D. Regarding pixel C in FIG. 5A, the (ρ, θ) values given by cells E and F in FIG. 5B correspond to the line formed by pixels C and A. (The values in cells E and F are equivalent, i.e., define the same line in x-y space.) Regarding pixel D in FIG. 5A, cell G in FIG. 5B corresponds to the line formed by pixels D and H in FIG. 5A. The algorithm could choose to ignore these lines as noise by selecting the accumulator cell with the maximum data as representing the best fit for all the data. If there is more than one accumulator cell with large or maximum value, each indicates a likely feature line in the digital image.

The Hough transform can also be adapted for use in identifying circular image features, features identified according to other regular mathematical formulas, or random features (e.g., using the generalized Hough transform). Further information about the Hough transform and its implementation in the context of digital image processing can be found in a number of U.S. patents, including U.S. Pat. No. 5,832,138 to Nakanishi et al., the aforementioned patent to Beyerer et al., U.S. Pat. No. 5,063,604 to Weiman, U.S. Pat. No. 6,732,046 to Joshi, U.S. Pat. No. 3,069,654 to Hough, U.S. Pat. No. 6,826,311 to Wilt, and U.S. Pat. No. 5,220,621 to Saitoh, all hereby incorporated by reference herein in their entireties.

In image processing or analysis using the Hough transform or otherwise, it is typical for an image to be processed in row-column order such that each pixel in the source image is visited as part of a transformation or some other form of analysis. For example, as described above with reference to FIGS. 5A-5C, in a typical algorithm using the Hough transform, each pixel of interest (e.g., a 1 or other non-zero value) in the array in FIG. 5A would be sequentially translated into Hough space, namely, into a plurality of normal parameters, for incrementing the appropriate accumulator cells in the memory array in FIG. 5B. In general, this type of process is written in a high-level programming language using nested "for" loops, such as the following:

```
FOR INTEGER y ← 0 TO height DO BEGIN
    FOR INTEGER x ← 0 TO width DO BEGIN
        perform some action on (x, y)
    END
END
```

In operation, such a program would first visit the y=0 row, and perform an action on each x in that row (e.g., x→0 to 6 in FIG. 5A). For example, for each pixel in the row the program might perform a Hough transform as described above. Then, the program would move on to the y=1 row, the y=2 row, and so on until the last row in the matrix was reached.

As should be appreciated, this type of program offers a convenient structure for image analysis in the sense that certain optimizations can be applied to allow for the fast sequential access of pixel data. This program structure is also well suited for use in transformations where it is imperative that every pixel is examined. However, considering the large amount of data typically present in a digital image (e.g., potentially hundreds of thousands of pixels) and the processor-intensive computations involved in processing images by way of a Hough or similar transform (e.g., many computations per pixel), it is not well suited for applications with limited processor and/or memory resources, e.g., in wireless devices such as mobile phones, portable computer terminals, and digital cameras.

SUMMARY OF THE INVENTION

An embodiment of the present invention relates to a method of analyzing a digital image. Typically, the image will include a plurality of image pixels arranged in an array. In carrying out the method, a number of pixels in the array are pseudo-randomly selected, e.g., by way of an algorithm for pseudo-randomly selecting cells in an array. The selected pixels are processed according to a parameterization transform. (By "parameterization transform," it is meant a mathematical algorithm/transform such as a Hough or Radon transform where data is converted/transformed from one form, e.g., x-y coordinates in Cartesian space, to another form that facilitates identification of features in the original data, e.g., line normal parameters in Hough space.) The number of pixels selected and processed is less than the total number of pixels in the image. The parameterization transform is inherently configured to function within the context of noisy images as simulated by the selection and processing of less than the total number of pixels in the image.

In another embodiment, as few as about 5 percent (e.g., 5±1 percent) of the total number of pixels in the image are pseudo-randomly selected for processing. Sampling this small a percentage of the total pixels in the image will typically reduce execution time by about 90 percent, while still providing enough data for identifying features of interest in the image.

In another embodiment, a digital image includes a number of pixels arranged in an array. Out of the pixels in the array, a subgroup of pixels is selected. The number of pixels in the subgroup is less than the total number of pixels in the image, and only the pixels in the subgroup are processed according to a Hough or other transform. The pixels in the subgroup are distributed about the entirety of the array. For example, the pixels in the subgroup may be pseudo-randomly selected, resulting in a pseudo-random distribution. If processing power is available, the pixels may be randomly selected, or randomly selected without duplication.

In another embodiment, the image analysis method is implemented on or as part of a digital imaging system, e.g., as a set of processor instructions stored in memory. The digital imaging system may include an image capturing mechanism such as a CCD sensor optically connected to a lens system. The image capturing mechanism is configured to obtain a digital image having a plurality of pixels. Typically, the pixels are stored as an array in memory. The system also includes a microprocessor for carrying out the image analysis method and other functions. For example, the processor may be configured to execute the instructions in memory for pseudo-randomly selecting and processing some sub-portion of the image pixels stored in memory, according to a Hough or similar transform.

In another embodiment, the pixels to be processed may be either negatively or positively pseudo-randomly selected. In both cases, a number of pixels (less than the total number of pixels in the image) are identified according to an algorithm for pseudo-random selection, e.g., of cells/members in a rectangular array. For a positive selection, the selected pixels are processed according to a Hough or other transform. For a negative selection, the selected pixels are deleted or otherwise disregarded, and the remaining, non-deleted pixels are further processed. As should be appreciated, unless otherwise specified herein, the term "pseudo-random selection" refers to either a positive selection or a negative selection. In other words, pseudo-randomly selecting a group of pixels but processing the non-selected pixels constitutes a pseudo-random selection of the processed pixels.

BRIEF DESCRIPTION OF THE DRAWINGS

FIG. 6 is a simplified schematic diagram of an image processing or analysis system according to an embodiment of the present invention;

FIGS. 7A-7C are schematic views showing pixel arrays processed according to an embodiment of the present invention.

DETAILED DESCRIPTION

Figure 7C:
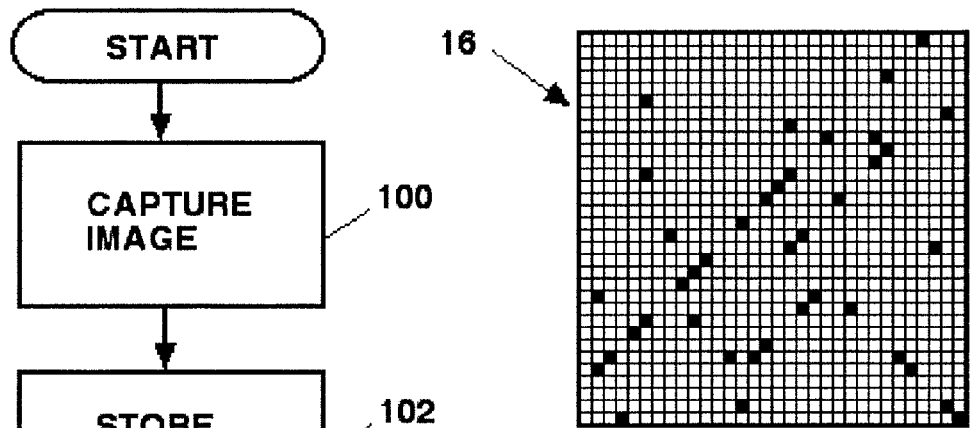
Figure 8:
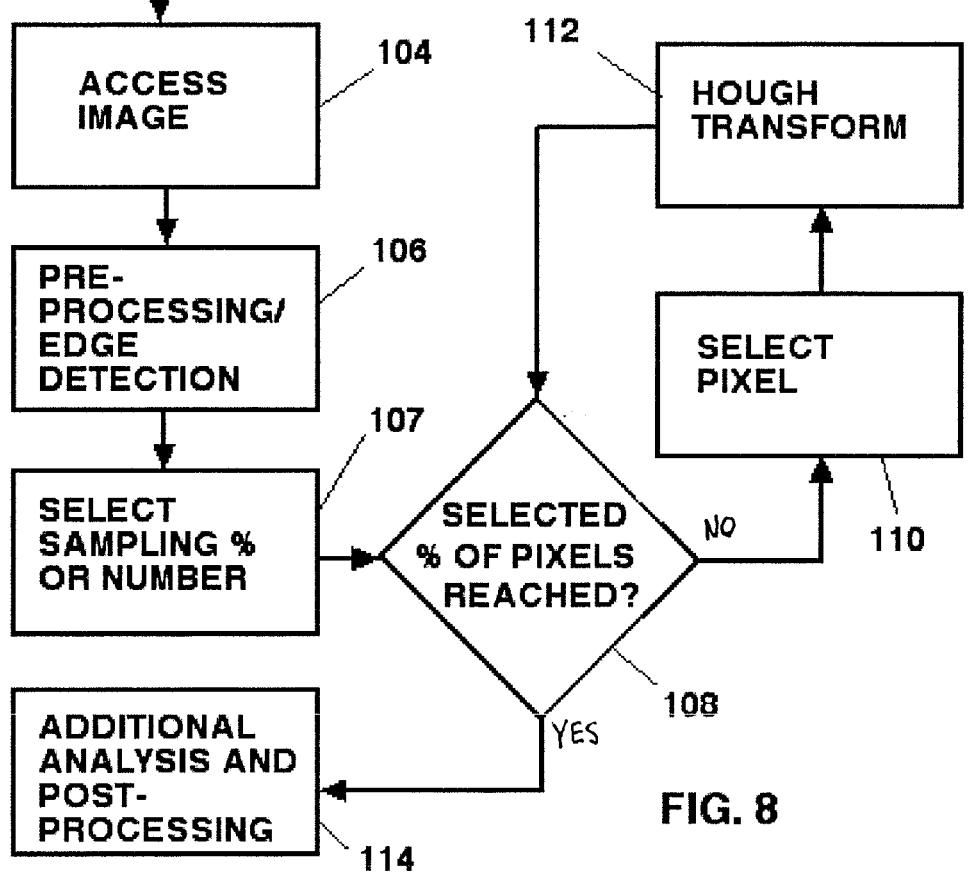
FIG. 8 is a flowchart showing operation of an embodiment of an image analysis method of the present invention.

Referring to FIGS. 6-8, an embodiment of the present invention relates to a method or system 10 for analyzing a digital image 11. Typically, the image 11 will include a plurality of image pixels 12 arranged in an array 14. In carrying out the method, a number of pixels 16 in the array are pseudo-randomly selected, e.g., by way of an algorithm 18 for pseudo-randomly selecting cells in an array. The selected pixels 16 are processed according to a Hough or other parameterization transform 20. (By "parameterization transform," it is meant a mathematical algorithm/transform such as a Hough or Radon transform, as described above, where data is converted/transformed from one form, e.g., x-y coordinates in Cartesian space, to another form that facilitates identification of features in the original data, e.g., line normal parameters in Hough space.) The number of pixels selected and processed is less than the total number of pixels in the image 11. The Hough transform 20 is inherently configured to function within the context of noisy images as simulated by the pseudo-random selection and processing of less than the total number of pixels in the image.

FIG. 6 illustrates (in simplified form) the image analysis method or system 10 as it might be implemented within the context of a typical digital imaging system or device 30. The imaging system 30 includes a computer or other electronic processor 32 electrically connected to a memory unit 34 and possibly to a screen or other display 36 for displaying image data. The processor 32 is also electrically connected to an image capture device 38, which includes a lens system 40 for capturing and directing light 42 reflecting off one or more objects 44 to a CCD sensor 46 or the like. The processor 32 controls the image capture device 38 (automatically and/or under the direction of a user) to selectively capture digital images 11 of the object 44 and to store the digital images in the memory unit 34 for display on the display 36 and/or for further processing. The design, implementation, and configuration of such imaging systems are well known in the art, and it is contemplated that the method of the present invention will typically be implemented as a stand alone or integrated set of processor instructions on existing imaging systems such as computer terminals, digital cameras, camera-equipped mobile phones, and dedicated image capture systems such as those found in remote surveillance devices.

As noted, the Hough transform 20 provides satisfactory image analysis results even though only a fraction of the pixels in an image are examined. In the system 10, it is more convenient to think of the pixel selection process as involving coordinate generation rather than iteration. Thus, the image analysis method 10 may be expressed in the following general form:

```
    INTEGER x, y;
    InitializeGenerator(width, height);
    DO BEGIN
        GenerateCoordinate(VAR x, VAR y);
        BOOL finished ← DoTransform(x, y, w, h, 0.30);
    WHILE (NOT finished);
```

Here, pixels in a matrix having a width "w" and height "h" are randomly selected according to variably generated x and y coordinates within the array, until 30 percent (0.30) of the pixels are selected. Each time a pixel is randomly selected, it is processed according to the "DoTransform" routine, e.g., a Hough transform algorithm. The algorithm may be configured to ignore cells in the array with a zero value (or a bit value lower than some threshold), or all the cells may be sampled, it being recognized the a sampling of all the cells will result in a corresponding sampling of the non-zero pixels in the array.

The image 11 is scanned in a way that is random or pseudo-random to ensure that the Hough transform 20 "sees" a fair sampling of the entire image 11. Using a true random number generator may not be practical in certain applications because of duplicate coordinates and/or because of the processor resources required to generate a sufficient number of unique coordinates. Accordingly, coordinates may be randomly generated with duplicates excluded, or a standard algorithm 18 for pseudo-randomly generating coordinates in an array may be used, for selecting pixels to be processed according to the Hough transform 20.

The operation of pseudo-random algorithms for coordinate selection is known in the art. The following example is adapted from Michael Morton, *A Digital "Dissolve" Effect, In* GRAPHICS GEMS, 221-232 (Andrew S. Glassner ed., Academic Press 1990):

```
    INTEGER mask, register, internalWidth, internalHeight;
    PROCEDURE InitializeGenerator(INTEGER width, INTEGER height)
    BEGIN
        register ← 1;
        mask ← RandomMasks[BitWidth(width) + BitWidth(height)];
        internalWidth ← width;
        internalHeight ← height;
    END
    PROCEDURE GenerateCoordinate(VAR INTEGER x, VAR INTEGER y)
    BEGIN
        y = register DIV internalWidth;
        x = register DIV internalHeight;
        IF (BitAnd(register, 1) <> 0) THEN register ← RightShift(register, 1) XOR mask;
        ELSE RightShift(register, 1);
    END
```

Here, the "InitializeGenerator" routine initializes the generator for the size of the array 14. Once initialized, the "GenerateCoordinate" routine is called to pseudo-randomly generate x and y coordinates. (Generally, pseudo-random selections are not truly random, but are approximately independent of each other, with any correlation being small enough to ignore for practical purposes.) It should be noted that this technique of coordinate generation generates values such that x and y range from 0 to the next power of 2 greater than or equal to the width and height of the array, respectively.

The following is an example of programming code for the image analysis algorithm/system "DoTransform( )" 10 using the pseudo-random generator above:

```
    INTEGER pixelsProcessed ← 0;
    INTEGER maxTotalPixels ← 0;
    PROCEDURE DoTransform(INTEGER x, INTEGER y, INTEGER w,
                          INTEGER h, FLOAT percentageToSample)
    BEGIN
        IF pixelsProcessed = 0 THEN maxTotalPixels = x * h *
    percentageToSample;
            /This initially calculates the number of pixels to process
            according to the array size and percentage of pixels to
            sample/
        IF (x > w OR y > h) THEN DoTransform ← FALSE;
            /If x or y is outside the array, then the transform is not
            performed/
        ELSE BEGIN
            ApplyHoughTransform(x, y, w, h);
            pixelsProcessed ← pixelsProcessed + 1;
            DoTransform ← pixelsProcessed >= maxTotalPixels;
            /This calls the Hough transform algorithm 20
            ("ApplyHoughTransform") for selected pixels until the
            maximum number of pixels to select and process has been
            reached/
        END
        IF (DoTransform) THEN pixelsProcessed ← 0;
    END
```

In this way, it has been found that accurate results for the Hough transform can be obtained by scanning as little as about five percent (e.g., 5±1 percent) of the total number of pixels in a digital image. This may reduce the execution time by as much as 90 percent, depending on the particular characteristics of the processing system such as processor type, memory speed, and compiler settings. Measurements have shown that for a typical processor, although it may take twice as long to process each pixel according to the random/pseudo-random process set forth herein, the total time saved is significant since far fewer pixels are processed. For example:

$$(1000 \text{ pixels}) \cdot (X \text{ sec/pixel})[\text{sequential access}] = 1000X \text{ seconds}$$

$$(50 \text{ pixels}) \cdot (2X \text{ sec/pixel})[\text{pseudo-random}] = 100X \text{ seconds}$$

It is contemplated that selecting between about 5 percent and about 30 percent of the total number of pixels in most images will result in significant processor resource savings while still providing accurate results from the Hough or other parameterization transform.

An embodiment of the image analysis process will now be further described with reference to FIG. 8, as implemented on the imaging system 30 in FIG. 6. At Step 100, a digital image 11 is captured by way of the image capture device 38. Typically, the image 11 will comprise a number of pixels 12 arranged in an array. Although shown graphically in FIG. 7A, as actually stored in memory each cell in the array would contain an encoded numerical value, e.g., in the simplest of cases a "1" value for black pixels and a "0" value for white pixels. The image 11 is then stored in memory 34, as at Step 102. At Step 104, the image 11 is accessed for processing. At Step 106, the image 11 is optionally subjected to one or more standard edge detection algorithms and/or other filtering or pre-processing algorithms. Edge detection algorithms are used to isolate pixels at the boundary of a feature of interest, since "interior" pixels might skew the Hough transform results. The image 11 in FIG. 7A is shown as having been processed according to an edge detection algorithm, resulting in the image 48 in FIG. 7B (again, graphic representations are presented for illustration purposes). A simple edge detection algorithm for the image in FIG. 7A might be as follows:

```
For each pixel:
    Examine all non-diagonal neighboring pixels
    IF at least one non-diagonal neighboring pixel = 0 THEN pixel ←
    pixel
    ELSE pixel ← 0;
```

In such an algorithm, a pixel is left "as is" if it has at least one white non-diagonal neighbor. If the pixel has only black pixels neighbors, the pixel is changed to a white, zero-value pixel.

Once the image is pre-processed at Step 106 (if desired), at Step 107 the number of pixels to process is selected or determined, out of the total number of pixels in the image. As noted above, it is possible to achieve accurate results from the Hough transform by selecting as few as about 5 percent of the total pixels in an image. The number of pixels to select and process may be a set number that provides adequate results for images of different sizes and quality levels, based on experimental validation. The number of pixels to select may also be based on user settings, and/or on one or more quality characteristics of the image. For example, if the image is a moderate- to high-resolution image (e.g., with a large number of pixels), it may be sufficient to select and process only 5 percent of the image. Images having a lower resolution may require selecting a larger percentage, e.g., 30 percent. Generally, the relationship is given as follows:

| IMAGE RESOLUTION | SAMPLING PERCENTAGE |
| --- | --- |
| Low | Higher |
| High | Lower |

Other quality characteristics may include the color format of the image (color, black and white, grey scale), contrast, and the subject matter of the image. For example, high contrast, black and white documents typically require a smaller degree of sampling than images such as night landscapes.

Next, the image analysis algorithm 10 commences analyzing the image 48. At Step 108, it is determined if the number or percentage of pixels to select has been reached. If not, at Step 110 one of the pixels in the image 48 is pseudo-randomly selected. Then, at Step 112 the selected pixel is processed according to the Hough transform 20. This continues until the desired sampling percentage is reached, resulting in the pseudo-random selection of a subgroup 16 of the pixels in the image (shown graphically in FIG. 7C). The particular steps of the algorithm 20 will depend on the particular form of the parameterization transform used and the particular manner in which it is implemented in code. For example, in a Hough transform the steps for each selected pixel might include transforming Cartesian coordinate data to normal parameters in Hough space and incrementing cells in an accumulator matrix according to the normal parameters, as described above.

Figure 1A:
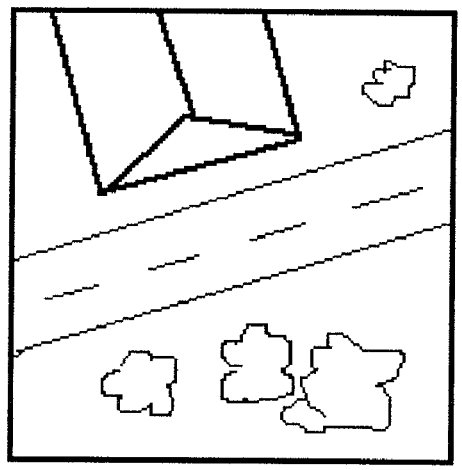
FIGS. 1A-1D are schematic views illustrating a digital image analysis process in conceptual form.
Figure 1B:
Figure 1C:
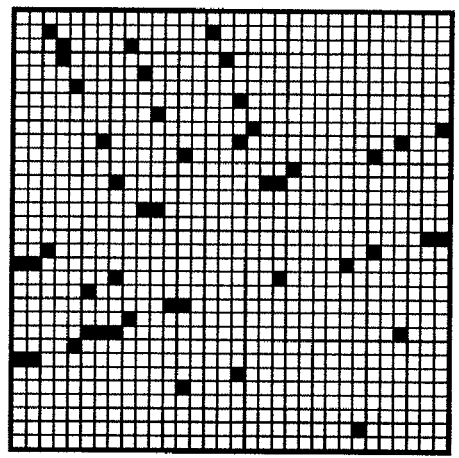
Figure 1D:
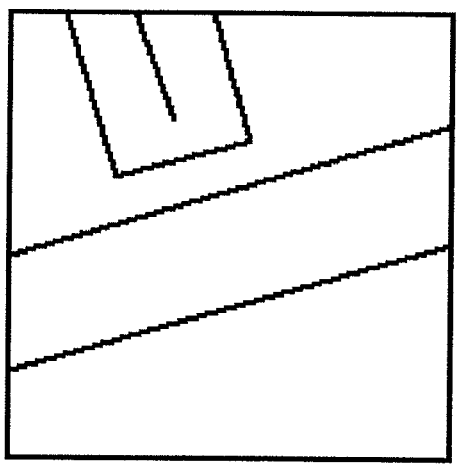
Figure 2A:
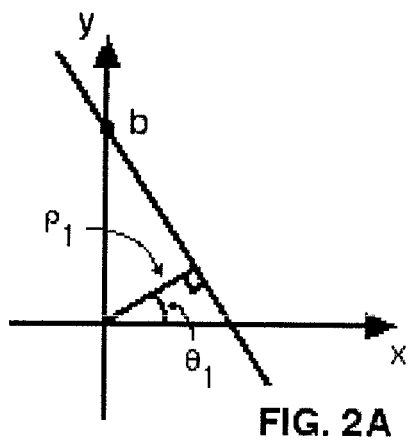
FIGS. 2A-5C are schematic views illustrating the Hough transform within the context of digital image processing or analysis.
Figure 2B:
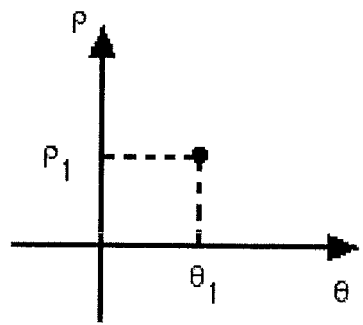
Figure 3A:
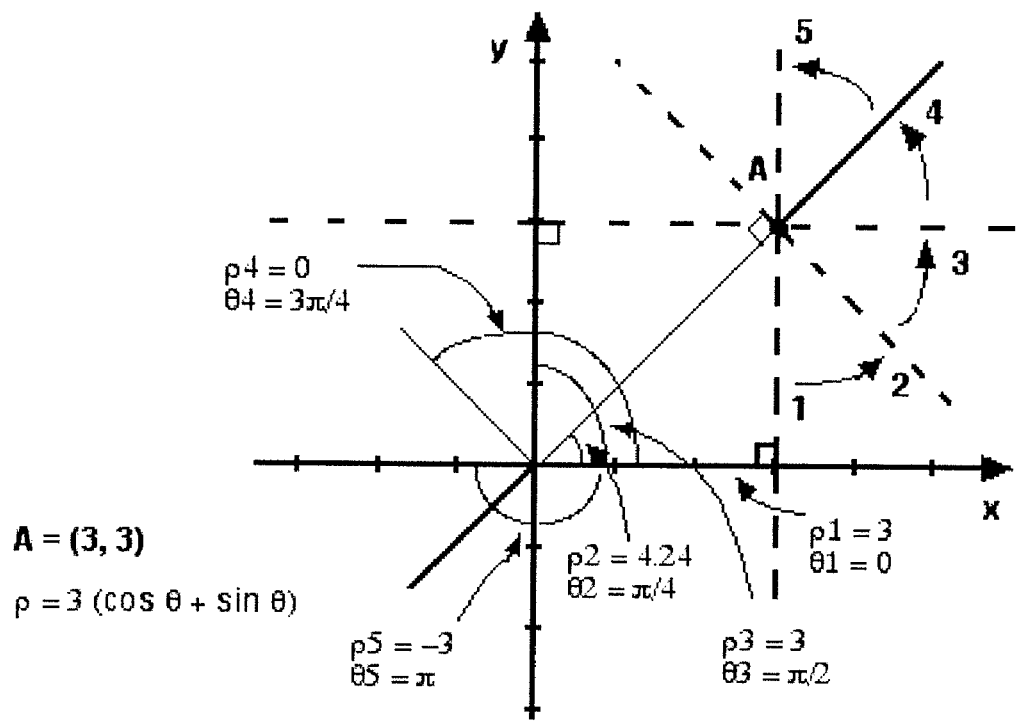
Figure 3B:
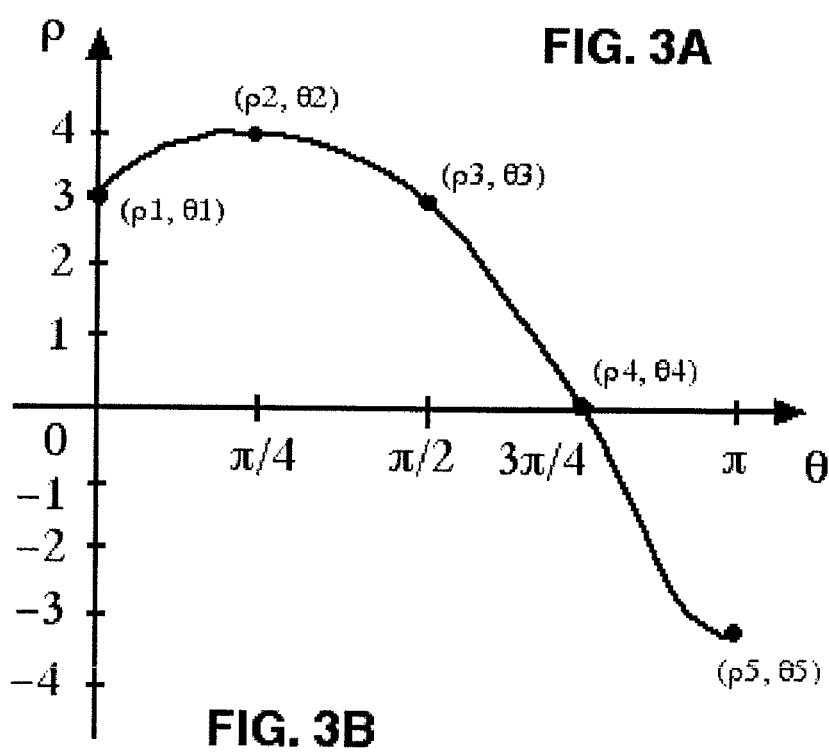
Figure 4A:
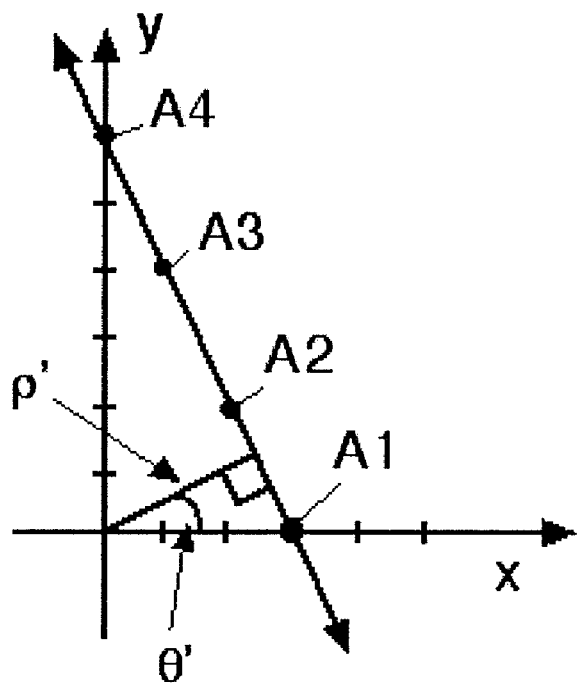
Figure 4B:
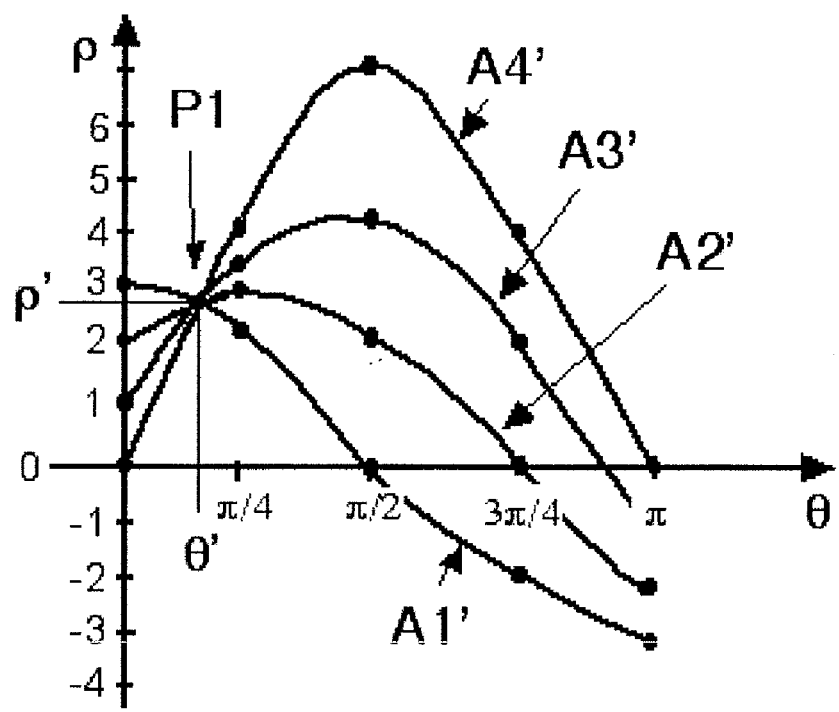
Figure 5A:
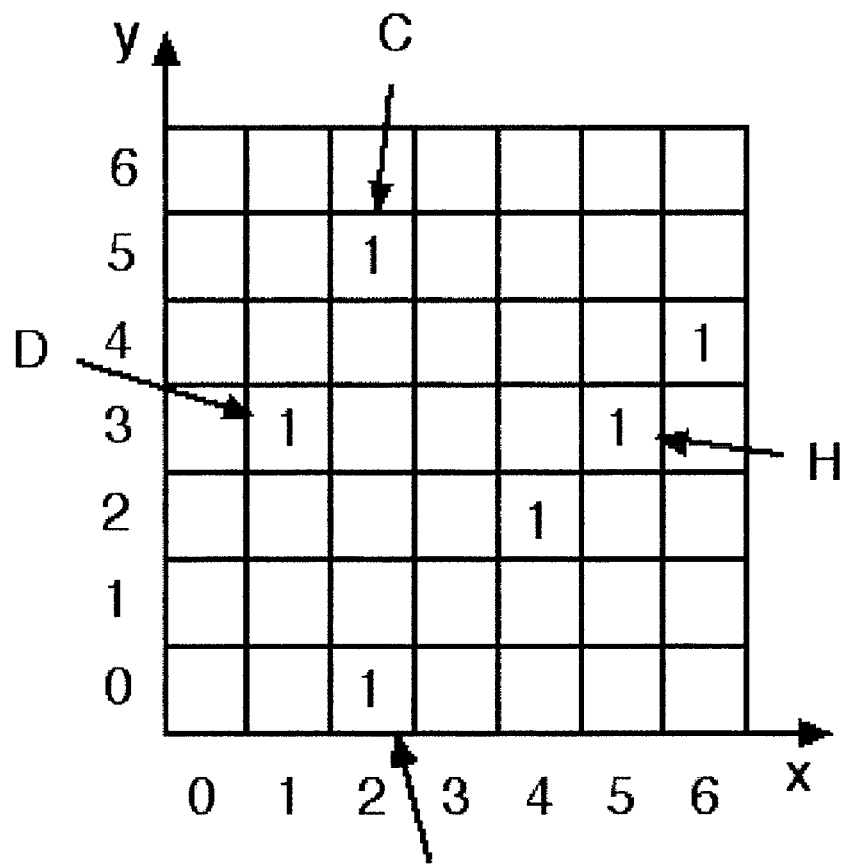
Figure 5C:
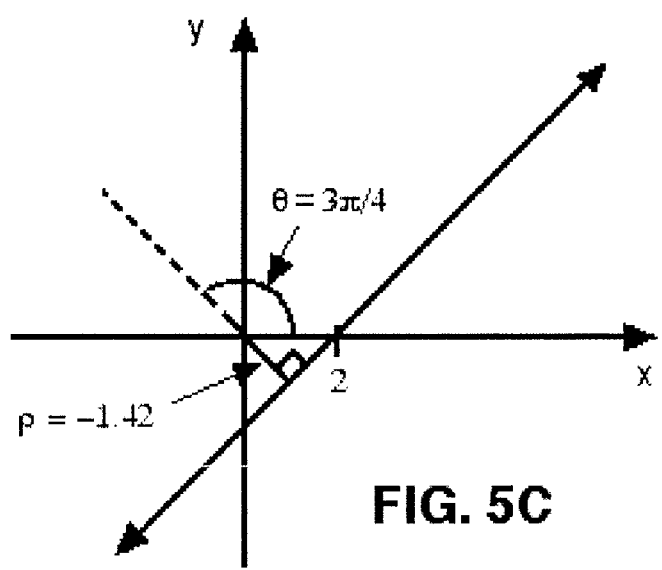
Figure 5B:
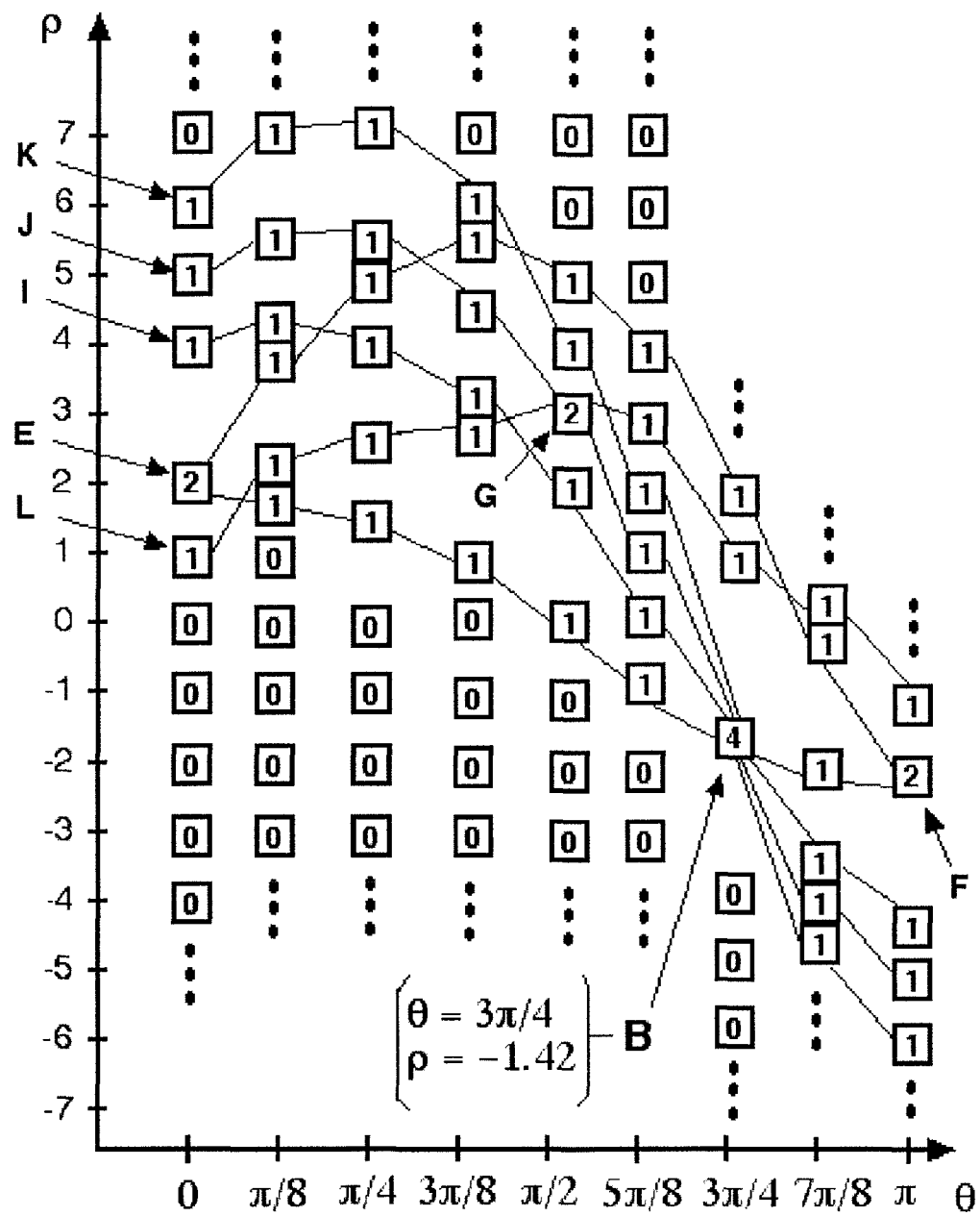

Once the desired number/percentage of pixels is reached, e.g., 30 percent, as determined at Step 108, it is typically the case that additional Hough transform and/or post-processing steps will be carried out, as at Step 114. Such steps might include identifying accumulator matrix cells having maximum values (see FIG. 5B and accompanying description), and converting the normal parameter values of the identified accumulator matrix cells to Cartesian coordinate values for identifying features of interest in the original image 11. The Cartesian coordinate values might then be used to display an enhanced image, for example as shown in FIG. 1D.

As noted above, the pixels for processing according to the Hough transform may be either negatively or positively pseudo-randomly selected. In both cases, a number of pixels less than the total number of pixels in the image 11 are identified according to an algorithm for pseudo-random selection 18. For a positive selection, the selected pixels are processed according to the Hough transform algorithm 20. The pixels may all first be selected, and then processed, but more typically the pixels will be selected and processed sequentially. For a negative selection, the selected pixels are deleted or otherwise disregarded, and the remaining, non-deleted pixels are processed using the Hough transform algorithm 20.

Although the present invention has been illustrated primarily with respect to the Hough transform for identifying linear features in an image, it is just as applicable to Hough and similar transforms for identifying not only other regular features/curves, e.g., circles and ellipses, but also irregular features, e.g., using a generalized Hough transform. Also, the method is applicable to simple black and white images, grey scale images, and color images.

As noted above, a digital image is typically arranged as an array of cells, with each cell having a numerical value and constituting a pixel (picture element). Thus, cells with a zero value in a black and white image are typically considered white pixels. In grey scale and color images, there will be a range of numerical values representing different levels of brightness, tone, etc. The Hough and similar transforms are used to identify features in the image. As such, it is necessary to differentiate pixels in the image according to one or more threshold or weighting criteria. For example, in the simplest example, in an image comprising only black and white pixels, the black pixels might be considered pixels of interest, with the white pixels being ignored. In a grey scale image, pixels having at least a certain level of grey might be considered pixels of interest or the pixels might be weighted in carrying out the image analysis method. For example, in a simple weighting scheme, accumulator cells in an accumulator matrix (FIG. 5B) could be incremented by 1 for black pixels, by 0.5 for grey pixels, and white pixels ignored. Accordingly, as should be appreciated, the term "pixel" as used herein refers to pixels of interest within the context of the image to be processed.

As noted, the method of the present invention may be used on an imaging system having an image capture device as described above. Any type of image capture device may be used. Moreover, the image analysis method/algorithm may be used on or in conjunction with systems that do not have image capture devices, e.g., a computer or other electronic device or terminal where image data is supplied in electronic form from another source, by way of a portable memory medium (e.g., floppy disc) or an electric connection (e.g., a wireless connection, the Internet, or the like).

As should be appreciated, although the system 10 for analyzing a digital image has been primarily described herein as being implemented as processor instructions for controlling a general purpose or dedicated processor 32, the system could also be implemented using electronic hardware, or a combination of dedicated hardware and software/instructions, according to standard procedures well known in the art. This would include the functionality of the Hough transform algorithm 20 and pseudo-random coordinate generator 18, both of which are suitable for implementation in hardware in a straightforward manner.

The image analysis method/system of the present invention is independent of the manner or application in which the data resulting from the cumulative Hough transform procedure is used. In particular, in the examples given above the Hough or other parameterization transform is used for purposes of feature extraction in a digital image, such as determining the equations of line data in Cartesian space for enhancing an image for display or other use. However, the Hough transform may be used for other purposes, such as detecting global or local feature rotation in an image. One example of feature rotation is text skew in an imaged document. Skew occurs whenever a document image (obtained from a camera, scanner, or the like) does not properly represent horizontal lines of text on the actual document. Skew is typically corrected prior to performing character recognition of the document image. Skew correction generally requires the determination of a skew angle and modification of the digital image based on the skew angle. A Hough transform can be used to detect the skew angle by identifying maximums in Hough space: the skew angle is directly obtained from the polar angle $\theta$ corresponding to the maximum value accumulator cell. In other words, the equation of a line is given by an angle $\theta$ and offset $\rho$ in Hough space. If the offset is ignored, the modal angle $\theta$ provides the angle of the line "by itself" and hence the rotation (skew angle) of the area scanned. When implemented in this context, the image analysis method of the present invention, in conjunction with a Hough or other parameterization transform, can be applied to correcting document scanning errors, automatic stabilization in a camera, aligning parts in automated fabrication, robotics, etc.

Figure 9:
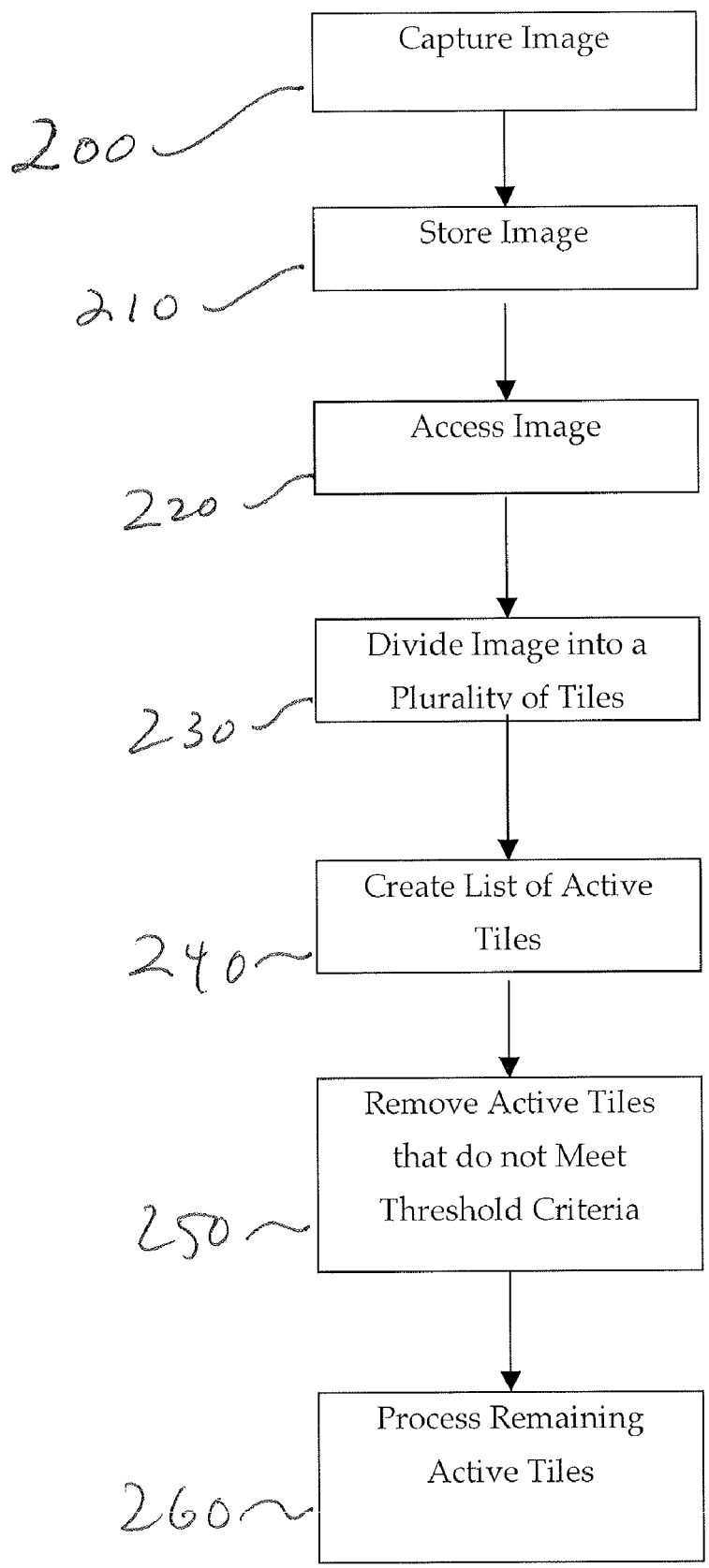
FIG. 9 is a flowchart showing operation of an embodiment of an image analysis method of the present invention including a tiling process.
Figure 10:
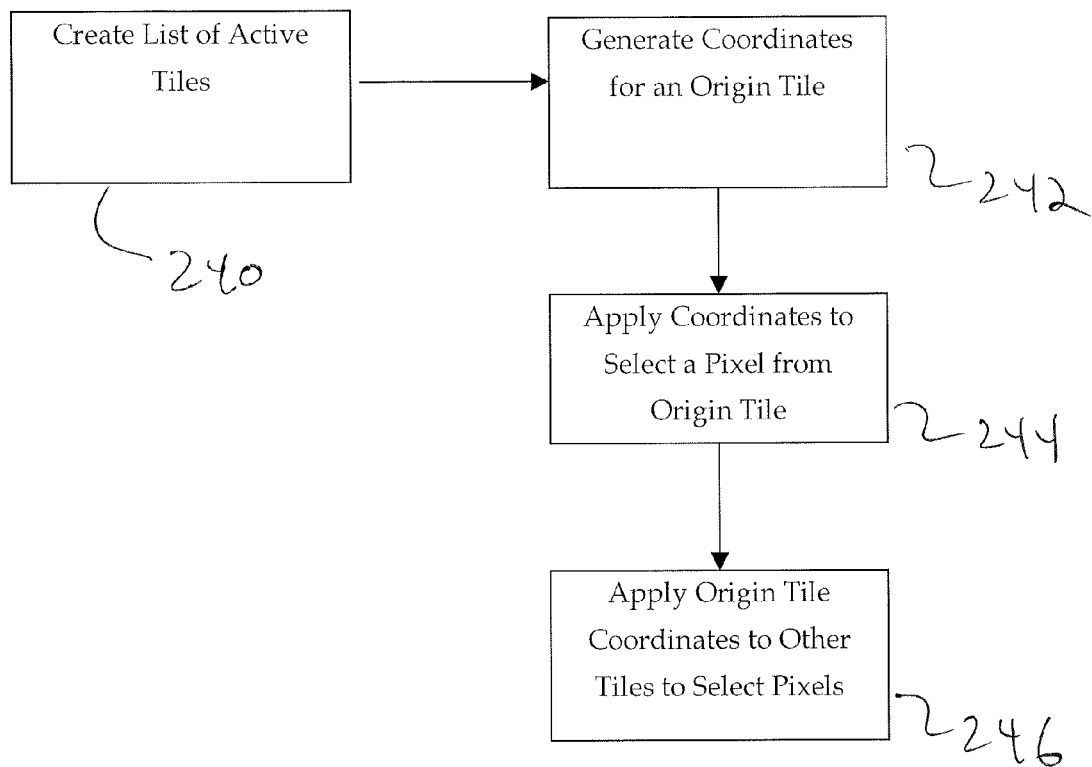
FIG. 10 is a flowchart showing operation of the method of FIG. 9.
Figure 11:
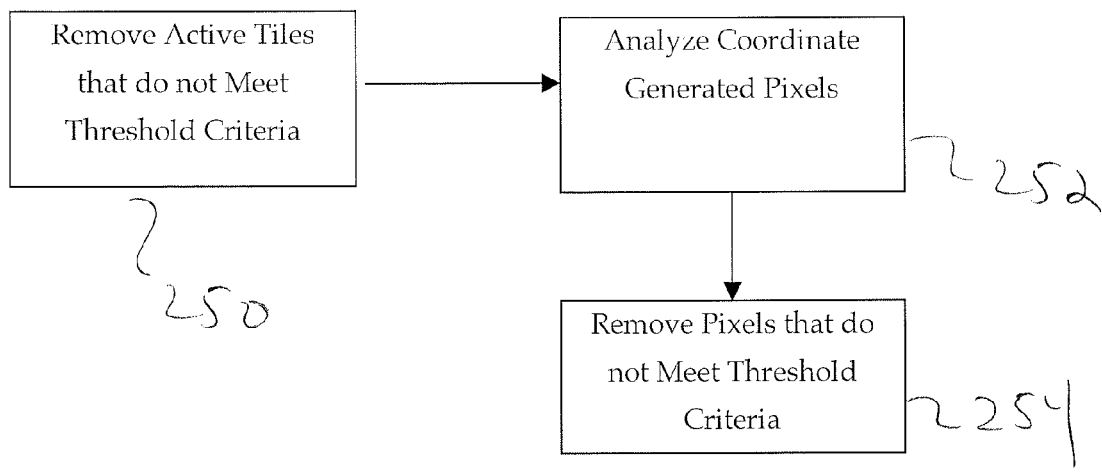
FIG. 11 is an additional flowchart showing operation of the method of FIG. 9.

As depicted generally in FIGS. 9-11, the inventive method of image analysis may also employ an additional step of dividing an image into coarse tiles to further refine the pixel selection process. More specifically, this process entails the step of initially dividing a digital image into coarse tiles (step 230) or sub-images each of which contains a subset of the pixels of the entire image. The division into tiles may be accomplished through known techniques which, as will be readily appreciated, are applied through an integrated set of processor instructions on existing imaging systems such as computer terminals as described above. The quantity of tiles per digital image, generally expressed as rows and columns of tiles, may vary.

For example, the number of tiles may depend on a predetermined number of pixels per-tile selected by a user. Typically, the tiles are square, though, as will be appreciated, other shapes, e.g., a rectangle, may be employed.

Tile division may create a simple grid. Alternatively, tiles could also be recursively defined, i.e., a tile is actually a set of sub-tiles, which are further subdivided allowing for the application of parallelization techniques.

After the image is divided into tiles, the tiles are analyzed to eliminate or cull those that do not yield positive results. In particular, a feedback mechanism is employed to allow the inventive pseudo-random coordinate generator, which is described in detail above, to filter out tiles.

More specifically, the process of generating coordinates is to create a list of "active tiles" (step 240), which may then be culled based on predetermined threshold criteria (step 250). In this process, the inventive coordinate generator would first generate pseudo-random coordinates in a first tile at an origin, i.e., an "origin tile." The origin tile pseudo random coordinates are then applied to each of the other tiles and the coordinates are translated to an active tile's coordinate space. In this manner, a list of active tiles is created.

The active tiles are then culled or removed (step 250). This is accomplished through a process in which, when a pixel is read from an active tile, the result of reading that pixel is sent back to the coordinate generator as "feedback" for that active tile. After an appropriate amount of pixels have been read and fed back, active tiles that are yielding "poor" results, i.e., do not meet threshold criteria, will be dropped from the active list.

This culling process (step 250) is generally accomplished through a feedback function (step 252) within each tile, which reports quality of signal. The quality of signal value could range from 0 to 1, or a selected bounded range, i.e., a percent, and could be applied to any area of image processing where signal can be measured For example, identifying OCR-able characters to segment documents into text/non-text areas; or the process of dynamically selecting a binarization algorithm. Coordinate selection could be done either lockstep across each tile or could be done individually per tile.

For example, each tile can count the number of black pixels read and the total number of pixels read and report this ratio to the coordinate generator. A low value would indicate too little useful signal and a high value would indicate too much signal, both "poor" results. At a particular point in time, which could be a percentage of total tile area, tiles will be culled if they fall into the predefined "poor" category, e.g., low and/or high pixel ratios.

The following is an example of programming code for the feedback/elimination step:

```
public class Tile {
private int tileOffsetX, tileOffsetY;
private int totalPixels;
private int totalBlackPixels;
PixelValue ReadPixel(int x, y)
        // x and y within tile space
PixelValue value = ReadOffsetPixel(image, x + tileOffsetX, y +
tileOffsetY);
totalBlackPixels += value.IsBlack( ) ? 1 : 0;
totalPixels++;}
        // Measure quality returns a value from 0 to 1.0
        // We know that for the Hough transform that too much and too
        // little signal is undesirable, so the data ratio is folded back on
        // itself - 0 - .5 is scaled to 0.1 and .5 to 1 is scaled and inverted.
float MeasureQuality( ){
    float ratio = totalBlackPixels / totalPixels;
    if (ratio <= 0.5)
      return 2 * ratio;
    return (1.0 - 2 * (ratio - 0.5));}
```

As will be appreciated, there are a numerous sets of conditions or threshold criteria that can be applied to separate "good" results from "poor" results which would depend upon the image processing application. For the inventive Hough transform, the selection of a poor result/tile could be "far too white" or "far too black" as noted above. This would eliminate tiles with overlay black or white areas that would normally either fool the Hough transform such as, for example, a black band in a logo, or provide no useful signal, e.g., background.

When to apply active tile culling is also dependent upon the image processing application. Furthermore, the best time to cull can be determined empirically by training an application on a suite of canonical images.

After the culling process has finished, any remaining tiles may be processed according to a parameterization transform such as the Radon and Hough Transforms described herein (step 260).

Tiling is an important aspect of the present invention, as it has been found that with tiling an accurate deskew of a document image can be obtained by scanning as little as about 0.5 percent of the total number of pixels in the image. As should be readily apparent, this may reduce the execution time, depending on the particular characteristics of the processing system such as processor type, memory speed, and compiler settings.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. Electronically-readable media tangibly embodying a program of instructions executable by a processor to perform a method of image analysis, the method comprising the steps of:
    dividing said digital image into a plurality of tiles;
    creating a list of active tiles from said plurality of tiles;
    removing active tiles from said list that do not meet a threshold criteria.

2. The media of claim 1 wherein said step of creating a list of active tiles from said plurality of tiles comprises:
    pseudo-randomly generating coordinates for an origin tile;
    applying said pseudo-randomly coordinates to select a pixel from said origin tile; and
    applying said origin tile coordinates to other of said plurality of tiles to select pixels.

3. The media of claim 1 wherein said step of removing active tiles from said list comprises:
    analyzing said pseudo-randomly generated pixels to determine if each pixel meets a threshold criteria; and
    removing tiles in which pixels from said tiles do not meet said criteria.

4. The media of claim 1 further comprising the step of processing any remaining active tiles according to a parameterization transform.

5. The media of claim 2 wherein the parameterization transform is a selected one of a Radon transform and a Hough transform.

6. Electronically-readable media tangibly embodying a program of instructions executable by a processor to perform a method of image analysis, the method comprising the steps of:
    dividing said digital image into a plurality of tiles;
    creating a list of active tiles from said plurality of tiles;
    removing active tiles from said list that yield results that do not meet a threshold criteria; and
    processing remaining active tiles according to a parameterization transform.

7. The media of claim 6 wherein said step of creating a list of active tiles from said plurality of tiles comprises:
    generating coordinates for an origin tile;
    applying said coordinates to select a pixel from said origin tile; and
    applying said origin tile coordinates to other of said plurality of tiles to select pixels.

8. The media of claim 7 wherein said coordinates are generated either randomly or pseudo-randomly.

9. The media of claim 7 wherein said step of removing active tiles from said list comprises:
    analyzing said pixels to determine if they meet a threshold criteria; and
    removing tiles in which pixels from said tiles do not meet said criteria.

10. The media of claim 6 wherein the parameterization transform is a selected one of a Radon transform and a Hough transform.

11. A digital imaging system comprising:
    an image capturing mechanism configured for obtaining a digital image comprising a plurality of pixels stored in a memory of the digital imaging system; and
    a processor electrically connected to at least one of the image capturing mechanism and memory and configured for dividing a digital image into tiles, selecting a pixel from each of said tiles, and processing at least one of said pixels according to a parameterization transform, wherein the pixels are pseudo-randomly selected, and wherein the number of pixels processed is less than a total number of pixels in said digital image.

12. The digital imaging system of claim 11 wherein said parameterization transform is a selected one of a Radon transform and a Hough transform.

13. The digital imaging system of claim 11 wherein said processor analyzes each of said pixels and performs said parameterization transform only on those tiles whose pixels meet a predetermined criteria.

14. A method of analyzing a digital image, the method comprising the steps of:
    dividing said digital image into a plurality of tiles;
    creating a list of active tiles from said plurality of tiles, wherein the active tiles on the list are selected from the plurality of tiles;
    removing active tiles from said list that do not meet a threshold criteria; and
    wherein said steps are performed by a digital imaging system that includes a processor.

15. The method of claim 14, wherein said step of creating a list of active tiles from said plurality of tiles comprises:
    pseudo-randomly generating coordinates for an origin tile;
    pseudo-randomly selecting a pixel from said origin tile based on the pseudo-randomly generated coordinates; and
    applying said origin tile coordinates to other of said plurality of tiles to select pixels.

16. The method of claim 14 wherein said step of removing active tiles from said list comprises:
    analyzing said pseudo-randomly generated pixels to determine if each pixel meets a threshold criteria; and
    removing tiles in which pixels from said tiles do not meet said criteria.

17. The method of claim 14 further comprising the step of processing any remaining active tiles according to a parameterization transform.

18. The method of claim 14 wherein the parameterization transform is a selected one of a Radon transform and a Hough transform.

19. The method of claim 1 wherein the active tiles on the list are selected from the plurality of tiles, wherein a number of the active tiles is less than a total number of the plurality of tiles.

20. The method of claim 7 wherein the active tiles on the list are selected from the plurality of tiles, wherein a number of the active tiles is less than a total number of the plurality of tiles.

21. The method of claim 2, further comprising:
    determining whether a number of selected pixels satisfies a predetermined total pixel selection threshold;

continuing to select pixels until the number of selected pixels satisfies the predetermined total pixel selection threshold;

terminating the step of creating a list of active tiles from said plurality of tiles upon determining the number of selected pixels satisfies the predetermined total pixel selection threshold;

analyzing the selected pixels to determine if each pixel meets a threshold criteria;

removing tiles in which pixels from said tiles do not meet said criteria from the list of active tiles; and processing any remaining active tiles according to a parameterization transform.

22. The method of claim 2, wherein a total number of selected pixels is less than about 30 percent of a total number of pixels in the digital image and greater than about 5 percent of the total number of pixels in the digital image.

23. The method of claim 3, wherein the threshold criteria are selected from the group consisting of: pixel brightness and pixel tone, wherein pixel brightness is represented by a numerical value, and wherein pixel tone is represented by a numerical value.

24. The method of claim 23, further comprising: identifying one or more pixels characterized by one or more of a maximum pixel brightness value and a maximum pixel tone value.

25. The method of claim 14, wherein the threshold criteria are selected from the group consisting of: pixel brightness and pixel tone, wherein pixel brightness is represented by a numerical value, and wherein pixel tone is represented by a numerical value.

26. The method of claim 15, wherein a total number of selected pixels is less than about 30 percent of a total number of pixels in the digital image and greater than about 5 percent of the total number of pixels in the digital image.

27. The method of claim 17, wherein the parameterization transform comprises converting x-y coordinates of one or more of the plurality of tiles in a Cartesian space to coordinates of at least one of a Hough space and a Radon space.

28. The method of claim 17, further comprising:

determining a skew angle of the digital image based on the parameterization transform; and rotating the digital image based on the skew angle.

29. Electronically-readable media tangibly embodying a program of instructions executable by a processor to perform a method of image analysis, the method comprising:

dividing said digital image into a plurality of tiles;

creating a list of active tiles from said plurality of tiles, said creating comprising;

pseudo-randomly generating coordinates for an origin tile;

applying said pseudo-randomly coordinates to select a pixel from said origin tile; and applying said origin tile coordinates to other of said plurality of tiles to select pixels; and processing one or more tiles not on the list of active tiles according to a parameterization transform.

* * * * *